United States Patent

Taruki

[11] Patent Number: 5,839,044
[45] Date of Patent: Nov. 17, 1998

[54] IMAGE FORMING APPARATUS HAVING PAPER RECEIVING PORTION INSIDE THE BODY

[75] Inventor: Takashi Taruki, Hiratuka, Japan

[73] Assignee: Ricoh Company Ltd., Tokyo, Japan

[21] Appl. No.: 682,005

[22] Filed: Jul. 16, 1996

[30] Foreign Application Priority Data

Jul. 17, 1995 [JP] Japan ................................... 7-202841

[51] Int. Cl.⁶ .................................................. G03G 15/00
[52] U.S. Cl. ......................... 399/361; 399/367; 399/401; 399/405
[58] Field of Search ................................. 399/361, 363, 399/364, 365, 367, 373, 374, 377, 381, 405, 401

[56] References Cited

U.S. PATENT DOCUMENTS

| | | | |
|---|---|---|---|
| 4,650,313 | 3/1987 | Koike | 399/364 X |
| 4,814,825 | 3/1989 | Johdai et al. | 399/405 X |
| 5,151,742 | 9/1992 | Yamaguchi | 399/405 X |
| 5,296,908 | 3/1994 | Hatano et al. | 399/363 |
| 5,339,139 | 8/1994 | Fullerton et al. | 399/367 X |
| 5,416,570 | 5/1995 | Kondou | 399/367 |
| 5,446,524 | 8/1995 | Koike | 399/361 X |
| 5,515,150 | 5/1996 | Yoshie et al. | 399/367 |

FOREIGN PATENT DOCUMENTS 4-105458  4/1992  Japan .
5-201603  8/1993  Japan .

*Primary Examiner*—Sandra L. Brase
*Attorney, Agent, or Firm*—Oblon, Spivak, McClelland, Maier & Neustadt, P.C.

[57] ABSTRACT

An auto document feeder feeds and ejects original documents in order of the pages. A duplex and simplex image forming unit forms an image based upon information of the document read by a reading unit. The simplex or the duplex copy sheets are ejected into an injecting portion formed by an upper wall, a bottom wall and a side wall so that an operator can access the receiving portion from the front side of the image forming apparatus. A copy sheet inverting device between the auto document feeder and the ejection portion causes the copy sheets to be stacked on the receiving portion in order of the pages.

5 Claims, 6 Drawing Sheets

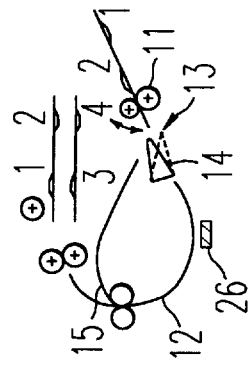
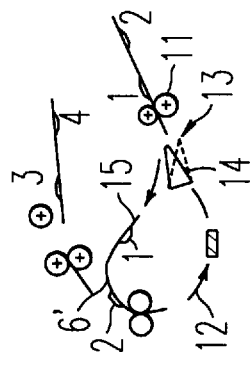
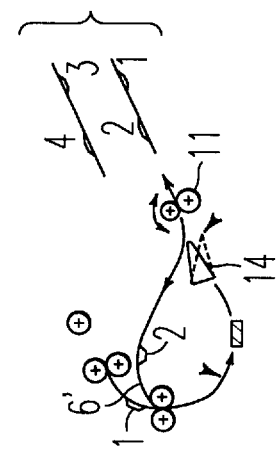
FIG. 3A ROUTE FOR THE FIRST PAGE
FIG. 3B ROUTE FOR THE SECOND PAGE
FIG. 3C COMPLETION OF EJECTING
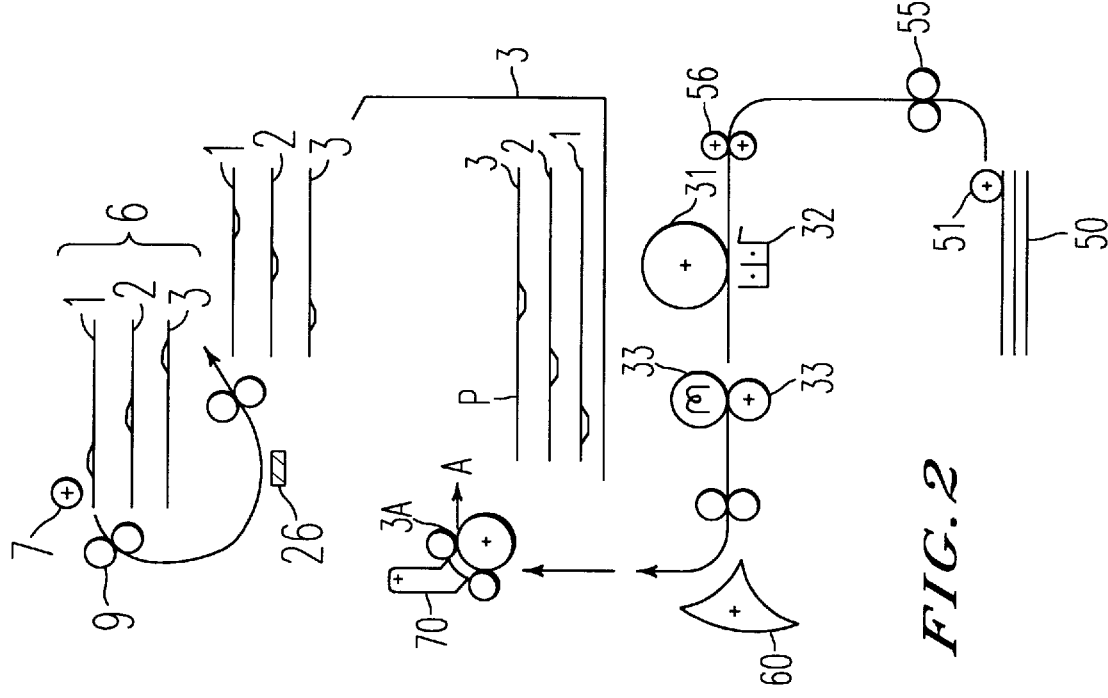
FIG. 2

SECOND PAGE

FIRST PAGE

EJECTING

PASSING OF THE
FIRST PAGE

READING OF THE
SECOND PAGE

READING OF THE
FIRST PAGE &
EJECTING

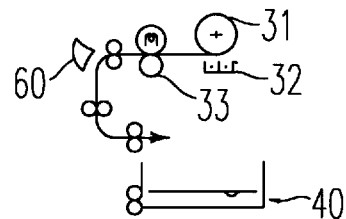
*FIG. 6A* COPY OF THE SECOND PAGE
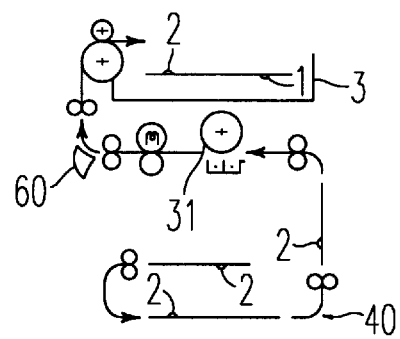
*FIG. 6B* COPY OF THE FIRST PAGE
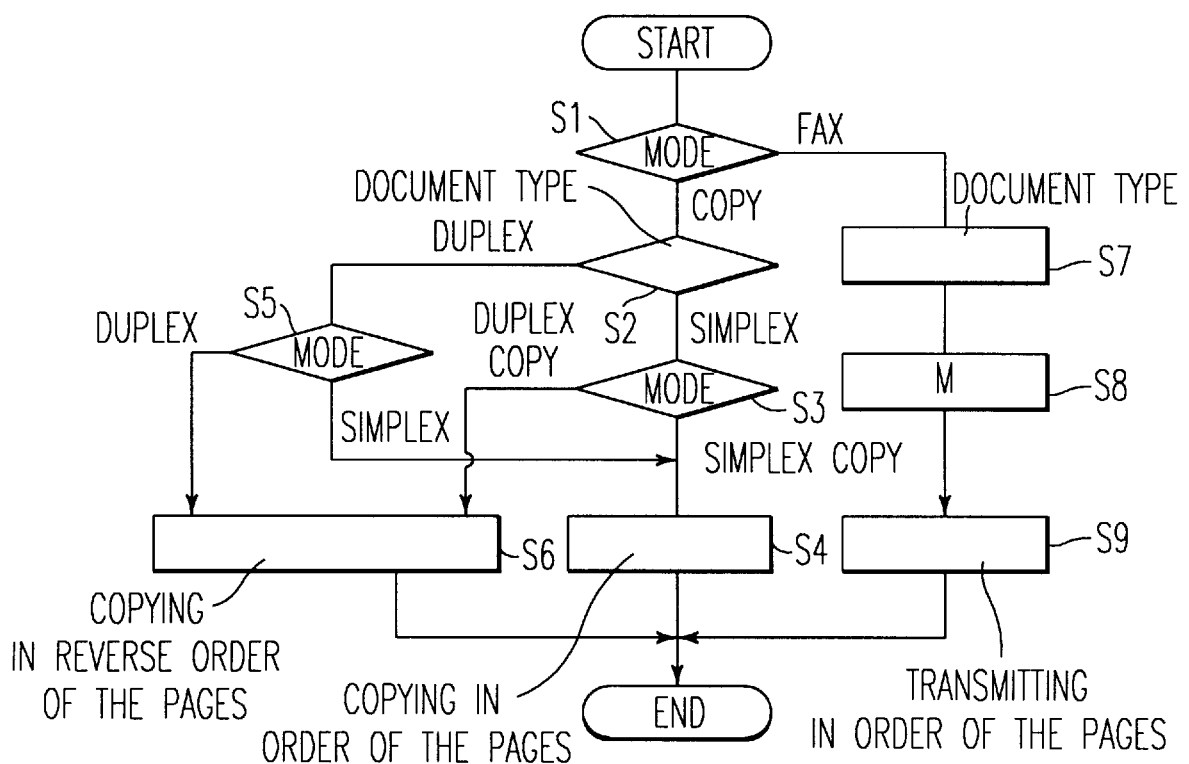
*FIG. 7*

IMAGE FORMING APPARATUS HAVING PAPER RECEIVING PORTION INSIDE THE BODY

BACKGROUND OF THE INVENTION

1. Field of the Invention

The present invention is related to an image forming apparatus, for example a copier, printer, facsimile, etc.

2. Discussion of the Background

Image forming apparatuses have recently become complicated due to the need to perform multiple functions, for example auto-document feeding and duplex copying. Therefore, they have become large and require much office floor space. In addition, in the conventional image forming apparatus, the paper tray for both the copy sheet and the original document extends outside of the body thereof, requiring yet more space.

SUMMARY OF THE INVENTION

Accordingly, it is an object of the present invention to minimize the necessary space for the image forming apparatus.

It is a further object of the present invention to enhance productivity of the image forming apparatus.

According to a feature of the invention, the above and other objects of the invention are accomplished by an image forming apparatus having a duplex copying function and comprising a document image reading unit; a copying unit disposed below said document image reading unit and including a visible toner image forming apparatus having a photoconductive element for forming a toner image based on image information of a copy sheet; a copy sheet cassette disposed at a bottom of said image forming apparatus and accommodating blank copy sheets; a duplex copy sheet tray disposed between said visible image forming means and said copy sheet cassette for temporarily receiving a one sided copy sheet and refeeding the same toward said visible toner image forming apparatus; and a copy sheet receiving part onto which a simplex or duplex copy sheet is ejected and stacked, disposed between said visible image forming apparatus and said document image reading unit.

According to another feature of the invention, the above and other objects of the invention are accomplished by an image forming apparatus, comprising a copy sheet cassette accommodating blank sheet therein; a duplex copy sheet tray for receiving a one sided copy sheet; a visible image forming apparatus for making a toner image on the copy sheet; a sheet feeder for feeding the copy sheet to said visible image forming apparatus; a copy sheet receiving part for receiving a copied sheet ejected therein; a copy sheet inverting path for inverting a copied sheet to be ejected into said sheet receiving part; a sheet feeding path for feeding a copy sheet from said copy sheet cassette to said visible image forming apparatus; a sheet receiving path for receiving a copied sheet into said sheet receiving part; and a sheet refeeding path for refeeding a sheet from said duplex copy sheet tray toward said visible image forming means. The copy sheet cassette, said duplex copy sheet tray, said visible image forming apparatus, said copy sheet receiving part and said copy sheet inverting path are laid out substantially vertically in said copying unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates both an original document transportation route and a copy sheet transportation route in the case where a one sided original document is copied;

FIGS. 3 (a), (b) and (c) illustrate an original document transportation route in the case where a duplex original document is copied;

FIGS. 6 (a) and (b) illustrate a copy sheet transportation route in the case where image information of an original document is transmitted by facsimile;

FIG. 7 illustrates a flow chart of the image forming process of the present invention.

DESCRIPTION OF THE PREFERRED EMBODIMENTS

Hereinafter, embodiments of the present invention will be explained in detail referring to the figures.

Figure 1:
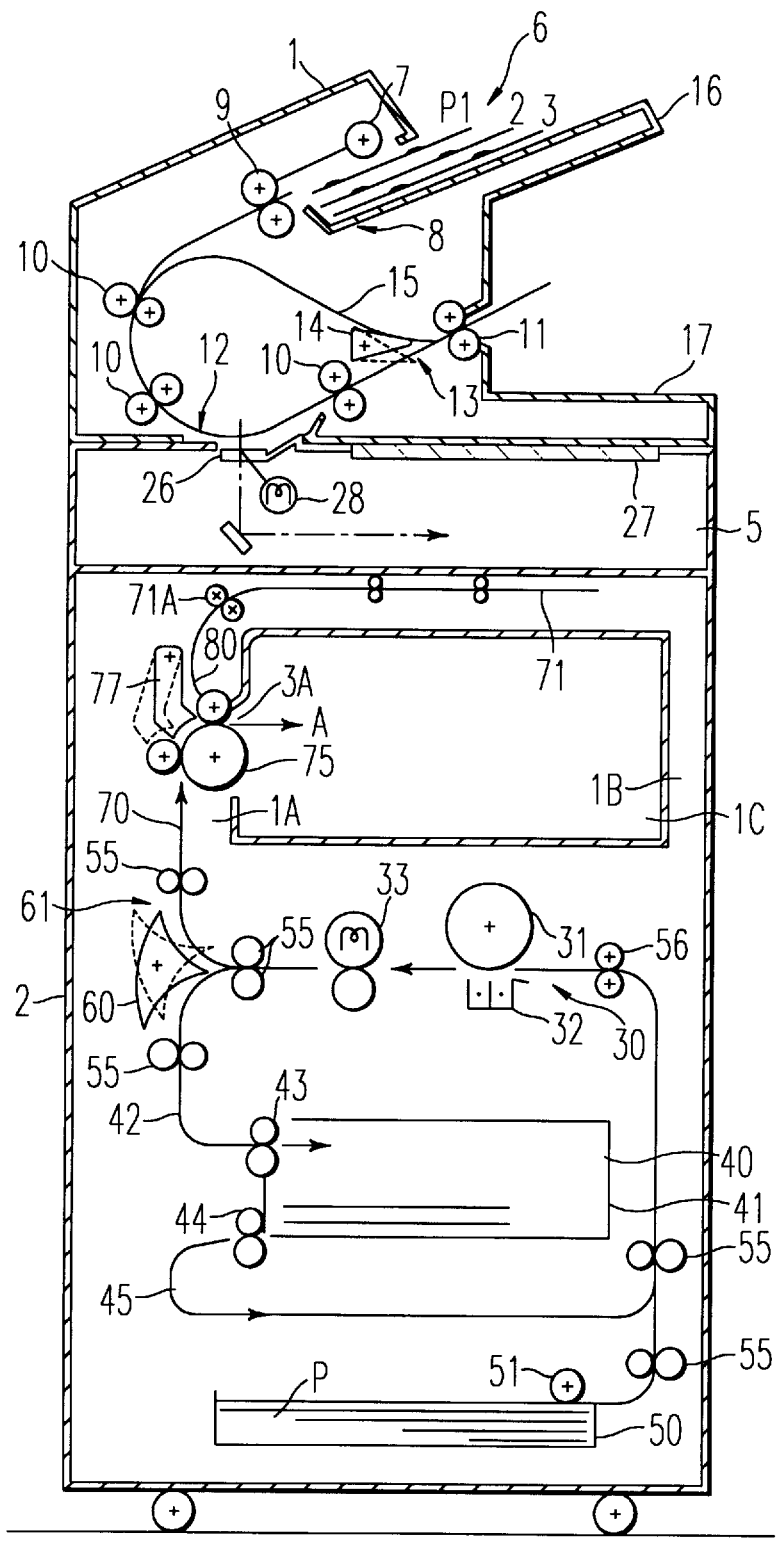
FIG. 1 is a cross sectional view of the image forming apparatus of the present invention.

As shown in FIG. 1, an image forming apparatus is comprised by a copying device 2, an image reading device 5 and an automatic document feeder 1 (ADF).

In the image reading device 5, a slit glass 26 and a contact glass 27 are disposed at the upper part thereof. The ADF 1 is disposed on the image reading device 5 and is pivotally mounted thereon so that it covers both the slit glass 26 and the contact glass 27 when it is closed. In the image reading device 5, a lamp 28 is disposed below the slit glass 26 or the contact glass 27 and is movable between them. In case the original document is fed by the ADF 1, the lamp 28 is positioned below the slit glass 26 to radiate a beam onto the document passing therethrough at a predetermined speed.

In the copying device 2, a copy sheet receiving part 3 is positioned below the reading device 5 and above the copying zone 30. The copy sheet receiving part 3 is defined by right and left side walls 1A, 1B and a back side wall 1C of the copying device 2. A front side of the wall of the copy sheet receiving part 3 is open so that an operator can have easy access thereto.

Hereinbelow, the structure of the image forming apparatus of the present invention is described. The ADF 1 is comprised by a table 16 on which an original document is set, a picking up roller 7 which picks up a topmost original document 6 set on the table 16, a sensor which detects the original document set on the table 16, a pair of the separating rollers 9 which separate the fed original document, a pair of the feeding rollers 10 which feed the document forward, the slit glass 26 at which the original document 6 is read, a receiving tray 17 onto which the read document is ejected, a pair of ejecting rollers 11 which eject the document onto the receiving tray 17, a synchronizing sensor 12 which detects the document in a feeding path at a position upstream of the reading position, an inverting path 15 through which the once read document is reverse fed by the pair of ejecting rollers 11, an ejecting sensor 13 which detects the read document and a switching gate 14 which is disposed downstream of the slit glass 26 and upstream of the receiving tray 17 and which selectively guides the document either toward the receiving tray 17 or toward the inverting path 15.

Hereinbelow, the structure of the copy device 2 is explained. The copying device 2 is disposed below the reading device 5. In the copy device, the copy sheet receiving part 3 is disposed just below the reading device 5. A copying zone 30 is disposed below the copy sheet receiving part 3.

In the copying zone 30, a photo-conductive drum 31, a transferring device 32 and a fixing device 33 are disposed. A duplex unit 40 is disposed below the copying zone 30. In the duplex unit 40 are disposed a duplex tray 41, a copy sheet inverting path 42 for feeding a copy sheet having been copied on one side thereof, a pair of receiving roller 43, a separating roller 44 which separates copy sheets stacked in the duplex tray 40 and a copy sheet refeeding path 45 through which a copy sheet fed from the duplex tray 41 is further transported toward copying zone 30.

A copy sheet cassette 50 is disposed below the duplex unit 40 and accommodates copy sheets P therein. A sheet feeding roller 51 is mounted to cassette 50, a pair of the transporting rollers 55 are disposed downstream of the cassette 50 and a synchronizing roller 56 which synchronizes the copy sheet P with a toner image formed on the drum 31 is disposed upstream of the drum 31. A copy sheet switching gate 60 changes the feeding direction of the copy sheet having an image thereon either to an ejecting path 70 or the copy sheet inverting path 42. A sensor 61 which detects a copy sheet P is disposed in the ejecting path 70.

A copy sheet switch back path 71 is disposed above the receiving part 3 starting from a receiving outlet 3A and elongated along the receiving part 3. However, the path 71 can be disposed below the receiving part 3 if the switching gate is disposed at a position upstream of the part 3.

The receiving outlet 3A is formed at a sidewall of the receiving part 3. A pair of ejecting rollers 75 for ejecting copy sheets into the receiving part 3 are disposed at the outlet 3A. A switching gate 77 is disposed between an terminal position of the ejecting path 70 and the starting position of the copy sheet inverting path 71 to guide the copy sheet either into the receiving part 3 or toward the inverting path 71.

Hereinbelow, an image forming process using a one sided original document is explained in detail referring to both FIGS. 1 and 2. A document setting sensor 8 detects the presence of an original document on the table 16 and outputs a signal to a controller (not shown in the figures). A copy start key (not shown in the figures) is disposed in a copying device 2. If the copy start key is energized, the ADF 1 and the copying device 2 start operating correspondingly. Therefore, the uppermost original document 6 (i.e., P1) is picked up by the picking up roller 7 and is separated (from documents P2, P3, etc.) by the separating rollers 9 and further fed by the transferring rollers 10 toward the slit glass 26.

Then, the document 6 is scanned by the lamp 28 while passing the slit glass 26, is fed by the transferring rollers 10 and receiving rollers 11 in the direction illustrated by an arrow in FIG. 1 and is finally stacked on the receiving tray 17. At that time, a document switching gate 14 is positioned at a position as illustrated by a solid line in FIG. 1. Thereby, the original document is guided and stacked on the tray 17 in order of the pages.

Hereinbelow, the transportation of the copy sheet P in the copying device 2 is explained in detail. The copying sheet P in a cassette 50 is fed out by the sheet feeding roller 51 and fed by both feeding rollers 55 and synchronizing rollers 56 to a position between the photoconductive drum 31 and the transferring member 32. Thereby, a toner image on the drum 31 is transferred onto the copy sheet P and the same is further fed to the fixing device 33 so that the toner image is fixed on the copy sheet P.

The copy sheet having been fixed is further transferred by the transferring rollers 55 through the sheet switching gate 60 which is positioned at the position illustrated by a solid line in FIG. 1. The sheet switching gate 77 guides the copy sheet P in the path 70 to the sheet receiving outlet 3A. Thereby, the copy sheets are ejected and stacked in the copy sheet receiving part 3 in the order of the pages.

Hereinbelow, an image forming process using a duplex original document is explained referring to FIGS. 1 and 3. First, a duplex copying mode in which a duplex copy is made from the duplex original document is set by the setting key disposed in an operating board (not shown in the figures). Second, a stack of duplex original documents is set on the original table 16 with the first page thereof facing up. In this state, if the start key is energized, an uppermost original document P1 is picked up and fed by the picking up roller 7 and the separating rollers 9 toward the slit glass 26. At the slit glass 26, the first page of the duplex document P1 is read by a reading device using the lamp 28. After completion of the reading thereof, the duplex document is fed toward the ejecting rollers 11.

When the sensor 13 detects passage of the trailing edge of the duplex original document 6', the controller controls the ejecting rollers 11 to stop rotating so that the document 6' is nipped between the ejecting rollers 11 and is not ejected onto the document receiving tray 17 (see FIG. 3a).

The controller further controls the sheet switching gate 14 to move from the solid line position to the position illustrated by dash lines in FIG. 3b and also controls ejecting rollers 11 to start rotating reversely so that the document 6' is fed to the inverting path 15.

The document 6' is then fed past the slit glass 26 with the second side of the duplex document 6' facing down, and read. After that, the document 6' is guided by the switching gate 14, then positioned as illustrated by the solid line in FIG. 3b.

Before receiving the document 6' which has been read the second time, the receiving rollers 11 are stopped with the document 6' nipped therebetween. The ejecting rollers 11 then start rotating reversely to feed the document 6' again to the inverting path 15. After that, the inverted document 6' is transferred past the slit glass 12 without being read and is finally ejected onto the receiving tray 3 with the first page thereof facing down. Thereby, both sides of the duplex documents are read in the order of the pages, and are ejected and stacked in the order of the pages thereof (FIG. 3c).

In the above mentioned embodiment, the once read document is desirably transported at a fast speed from the receiving rollers 11 to the sensor 12. Also, the twice read document is desirably transported at high speed from the ejecting rollers 11 to the receiving tray 17 via the slit glass 12.

Hereinbelow, the transportation of the copy sheet in the duplex mode, in which the duplex copy is made from a duplex document, is explained referring to FIGS. 4a, b and c. As shown in FIG. 4a, a copy sheet having been copied on one side thereof is accommodated in a duplex unit 40. The sheet switching gate 60 is pivotally disposed downstream of the fixing rollers 33 and guides the copy sheet having an image on only one side thereof to the duplex tray 40.

Figure 4B:
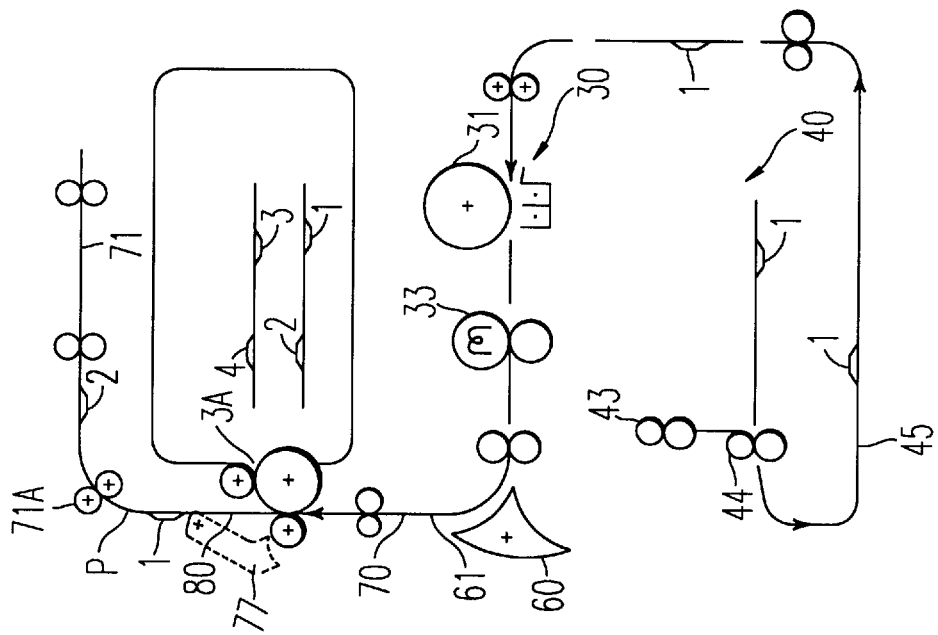
FIGS. 4 (a), (b) and (c) illustrate a copy sheet transportation route in the case where a duplex copy is made.
Figure 4A:
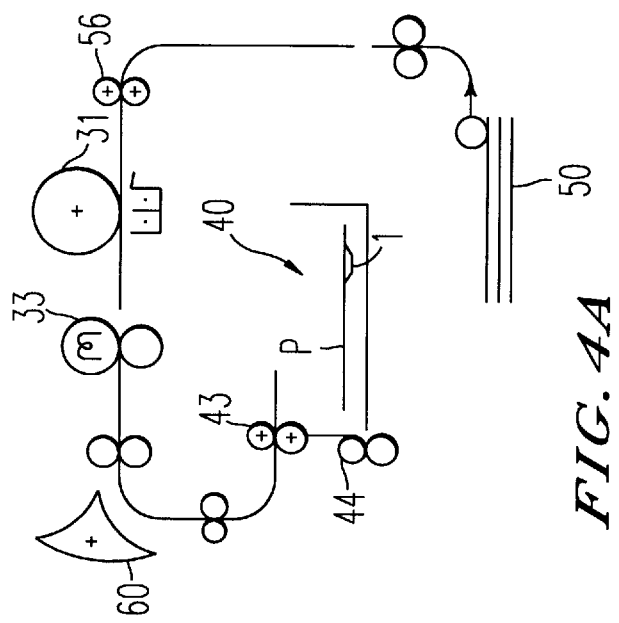

In FIG. 4b, transportation of the duplexed copy sheet is explained. Namely, a copy sheet having images on both sides thereof is transferred from copying zone 30 to the sheet ejecting path 70 and the sheet inverting path 71 because the switching gate 60 is in the solid line position shown in FIG. 4b, and the switching gate 77 is in the dash line position in FIGS. 1 and 4b. The duplex copy sheet transferred onto the inverting path 71 is stopped and switched back and further fed through the inverting path 71 reversely, and guided by the switching gate 77, then in the solid line position. Finally, the duplex copy sheet is ejected onto the receiving part 3 through the receiving outlet 3A.

As to the controlling of the transportation of the duplex copy sheet, transferring rollers 71A are controlled by the controller in the manner described below. The timing of stopping of the rollers 71A is determined based on the detection of a trailing edge of the copy sheet P by the sensor 80 disposed adjacent to the inverting path 71. The controller controls the transferring rollers 71A to stop rotating at a timing so that they nip the copy sheet therebetween, and then to start rotating reversely. After that, the switching gate 77 is returned to the solid line position shown in FIG. 1. Thereby, the duplex copy sheet is transferred toward the receiving outlet 3A through the gate 77.

The duplex copy sheets are continuously stacked on the receiving part 3 in the state that each of the pages of the duplex copy sheets faces down.

As mentioned above, since the transferring rollers 71A are employed for switching back the copy sheets, the copying device can be made compact and with less cost. After the sensor 61 detects the trailing edge of the copy sheet, the speed of the copy sheet is increased. Thereby, productivity of the copying is improved.

Figure 8:
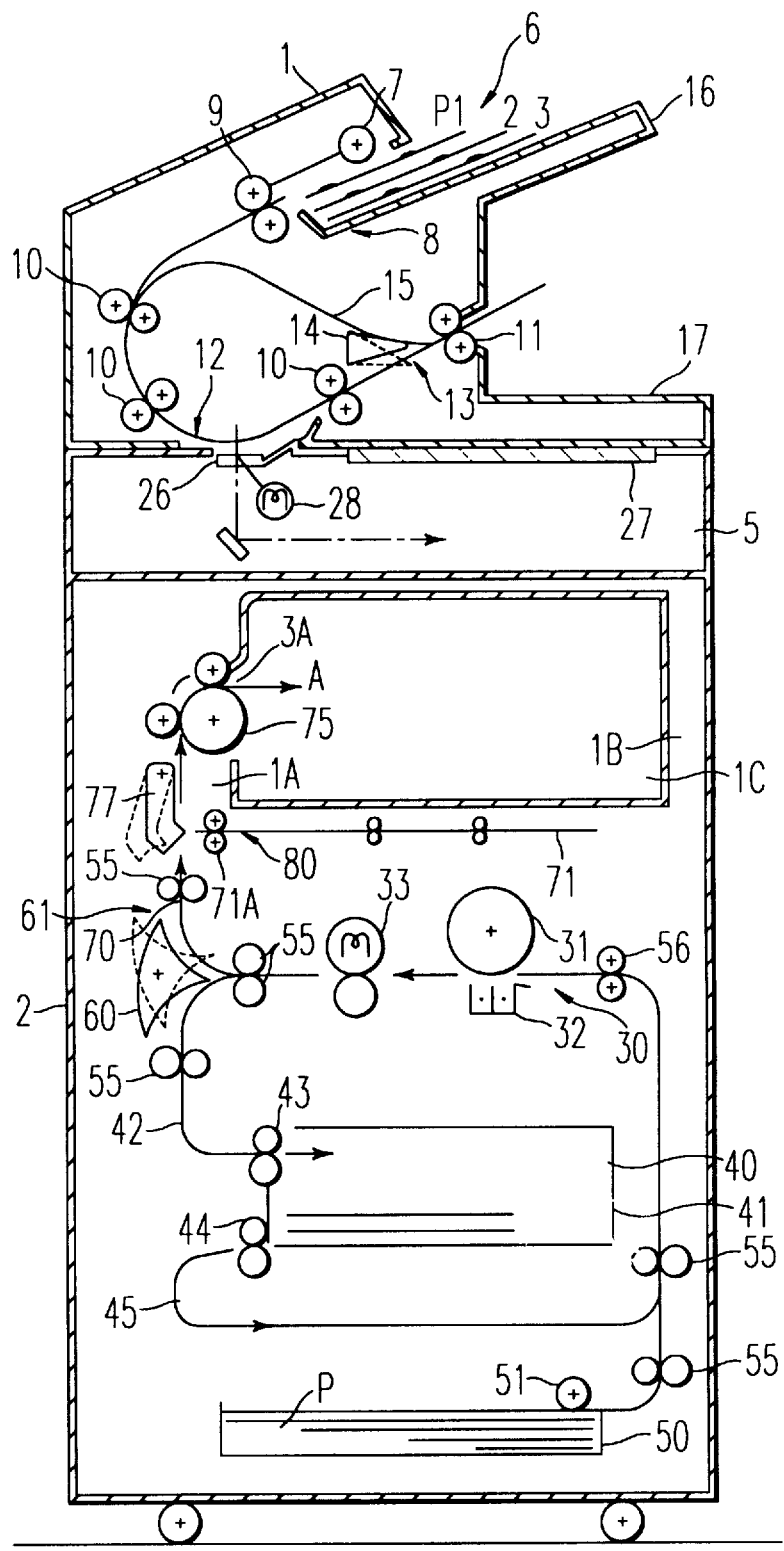
FIG. 8 is a cross sectional view of an image forming apparatus of the present invention having a sheet switchback path at a different part.

Hereinbelow, another embodiment of the present invention is explained referring to FIGS. 5, 6 and 8. In FIG. 5, movement of the ADF in a duplex mode, in which a duplex copy is made from a duplex document, is illustrated. First, a duplex copy mode is set by operating a conventional mode setting key. After that, if the start key is energized, a topmost original document 6' stacked facing up is picked up by the picking up roller 7 and separated by the separating rollers 9.

Figure 5A:
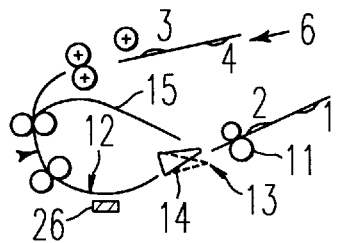
FIGS. 5 (a), (b) and (c) illustrate a original document transportation route in the case where image information of an original document is transmitted by facsimile.
Figure 5B:
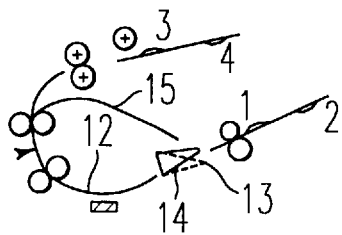

The document 6' passes the slit 26 without being read at the image reading portion 5 and is transferred downstream as if to be ejected by the ejecting rollers 11. However, the document 6' is not ejected entirely therefrom but is supported by the ejecting rollers 11 in the state that a latter part of the document is nipped therebetween (FIG. 5a). The controller controls the ejecting rollers 11 to stop rotation thereof and controls the switching gate 14 to move from the solid line position to the dash line position. The controller also controls the ejecting rollers 11 to start rotating reversely to transfer the document to the inverting path 15.

Figure 5C:
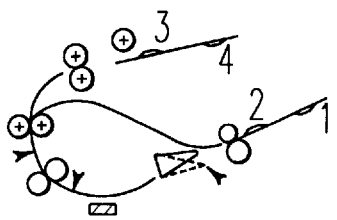

The original document 6' on the inverting path 15 is fed back past the slit glass 26 at which time the second side of the document 6' is read. After that the document is again nipped between the ejecting rollers 11 (FIG. 5b) and is fed reversely by the ejecting rollers 11 which start rotating reversely under the control of the controller, so that the document is again fed to the inverting path 15. After that the first side of the document 6' is read at the slit glass 26 and the document 6' is ejected onto the receiving tray 17 with the first page facing down (FIG. 5c). Thereby, the documents ejected subsequently onto the receiving tray 17 are stacked in order of the pages thereof.

In FIG. 6, transportation of the copy sheet is illustrated when the image reading of the duplex document is executed as shown in FIG. 5. As shown in FIG. 6a, image information of the second page of the first document 6' is transferred to a copy sheet and the image is fixed by the fixing device 33 and ejected into the duplex tray 40. After that, the image information of the first page of the document 6' is transferred to a back side of the copy sheet, which is refed from the duplex tray 40, as shown in FIG. 6b. After fixing of the image thereof, the copy having the images on both sides thereof is ejected into the receiving part 3 with the first page of the copy sheet facing down (FIG. 6b).

Figure 4C:
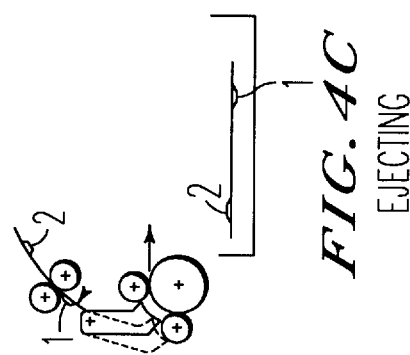

According to the second embodiment of the present invention, the duplex copy sheets are stacked in the receiving part 3 in order of the pages thereof without using the inverting path 71, the sensor 80, the transferring rollers 71A or the switching gate 77 of FIGS. 1 and 4.

In FIG. 7, a flow chart of the embodiment of the present invention is illustrated. In a facsimile mode, image information of the document read by the original reading device is sent to a remote facsimile device by utilizing the original reading device 5 and the ADF 1. In the conventional facsimile machine, a facsimile is made and received in order of the pages. Therefore, original documents on the document setting tray 16 are fed in order of the pages thereof (Steps 1, 7, 8 and 9).

In a simplex copying mode, the original documents are fed and read in order of the pages (Steps 1, 2, 3 and 4). In a duplex copying mode, where the duplex copy is made from the duplex original document, the back side of the original document is read earlier than the front side thereof (Steps 1, 2, 5 and 6).

According to the present invention, waste of floor space can be avoided because the copy sheet receiving part is disposed inside the copying device and the copy sheet inverting path is disposed above or below the copy sheet receiving part and because the copy sheet cassette, the duplex copy sheet tray, the copying zone, the sheet receiving part and the sheet inverting path are laid out almost vertically.

A simple controlling of the copying device is obtained because image processing is executed in the order of the pages. In addition, facsimile communication can be realized with the original documents and copies stacked in order of the pages.

Obviously, numerous modifications and variations of the present invention are possible in light of the above teachings. It is therefore to be understood that the invention may be practiced otherwise than as specifically described herein.

What is claimed is:

1. An image forming apparatus having a duplex copying function and comprising:

a document image reading unit;

an auto-document feeding unit disposed on said document image reading unit for automatically feeding a document to a document receiving tray;

a copying unit disposed below said document image reading unit and including a visible toner image forming apparatus having a photoconductive element for forming a toner image based on image information of a document;

a copy sheet cassette disposed at a bottom of said image forming apparatus and accommodating blank copy sheets;

a duplex copy sheet tray disposed above said copy sheet cassette for temporarily receiving one sided copy sheets and refeeding the same toward said visible toner image forming apparatus; and a copy sheet receiving part onto which a simplex or duplex copy sheet is ejected and stacked, disposed between said visible image forming apparatus and said document image reading unit, wherein all of said copy sheet cassette, said duplex copy sheet tray, said visible image forming apparatus and said copy sheet receiving part overlap such that all of said copy sheet cassette, said duplex copy sheet tray, said visible image forming apparatus and said copy sheet receiving part are intersected by a single vertical plane.

2. An image forming apparatus as claimed in claim 1, wherein said auto-document feeding unit, said image reading unit and said copying unit have a same width.

3. An image forming apparatus as claimed in claim 1 wherein said receiving part is disposed above said photoconductive element.

4. An image forming apparatus as claimed in claim 1, further comprising a document inverter for inverting an original document disposed downstream of said reading unit and upstream of said receiving tray.

5. An image forming apparatus as claimed in claim 1, further comprising a controller for controlling document feeding by said auto-document feeding unit and sheet transferring in said copying unit in a manner such that when duplex copy is made from duplex documents, each of second sides of said documents is read earlier than each of the first sides of said documents.

* * * * *